United States Patent [19]

Fiedler et al.

[11] 4,153,272
[45] May 8, 1979

[54] TORSION ROD STABILIZER ASSEMBLIES FOR VEHICULAR STEERABLE FRONT WHEELS

[75] Inventors: Kurt H. Fiedler, Geinsheim; Adolf Draisbach, Kelsterbach, both of Fed. Rep. of Germany

[73] Assignee: General Motors Corporation, Detroit, Mich.

[21] Appl. No.: 819,878

[22] Filed: Jul. 28, 1977

[30] Foreign Application Priority Data

Aug. 3, 1976 [DE] Fed. Rep. of Germany ....... 2634915

[51] Int. Cl.² ............................................. B60G 19/00
[52] U.S. Cl. ..................................................... 280/689
[58] Field of Search ........................................ 280/689

[56] References Cited
U.S. PATENT DOCUMENTS 2,169,969  8/1939  Allison ................................. 28/689

Primary Examiner—Richard A. Bertsch
Attorney, Agent, or Firm—Dean L. Ellis

[57] ABSTRACT

A torsion rod stabilizer assembly for independently sprung steerable front wheels of a vehicle, utilizing a generally U-shaped torsion rod stabilizer having a transversely extending central portion rotatably mounted on a part of the vehicle superstructure, and end portions forming lever arms extending generally longitudinally of the vehicle, the front wheels being rotatably mounted on stub axles carried by steering knuckles which are mounted for pivotal movement about respective steering axes.

To provide an increase in the stabilizing effect when the vehicle is cornering, the lever arms are pivotally connected by means of connecting links to the respective steering knuckles, or equivalent parts, at articulation points which are offset from the respective steering axes at locations such that during cornering the lever arm at the inside of the turn is moved downwardly by a steering-related force transmitted by way of the respective connecting link, and conversely the lever arm at the outside of the turn is moved upwardly.

5 Claims, 3 Drawing Figures

TORSION ROD STABILIZER ASSEMBLIES FOR VEHICULAR STEERABLE FRONT WHEELS

This invention relates to torsion rod stabiliser assemblies for vehicles having a pair of front wheels mounted for steering movement relative to the vehicle superstructure.

The invention is concerned with such assemblies in which each wheel is borne by a stub axle which is pivotable about a respective steering axis, and the torsion rod stabiliser is of U shape, having a central portion which extends in the transverse direction of the vehicle and is rotatably mounted on the vehicle superstructure, and angled end portions which extend approximately in the longitudinal direction of the vehicle and act as lever arms.

In known independent wheel suspension systems for the steerable front wheels of passenger cars, either the stabiliser is articulated to the wheel-guiding links, or the lever arms of the stabiliser form part of the wheel-guiding links.

In both cases, the stabiliser merely follows the rise and fall of the front wheels, or the deflections of the parts of the suspension system to which it is articulated. Under cornering conditions, the centrifugal force developed causes the part of the vehicle on the inside of the curve to be relieved of load to the same extent that the part of the vehicle on the outside of the curve is additionally loaded, whereby the lever arm of the stabiliser articulated to the suspension system of the wheel on the outside of the curve is forced upwards due to roll of the vehicle superstructure or to the more intense wheel bump movement relative to the vehicle superstructure, whereas the lever arm articulated to the part of the vehicle on the inside of the curve is moved downwards.

Seen in the transverse direction of the vehicle, this leads to relative angulation of the lever arms of the stabiliser, which is made possible by torsional twisting of the central portion of the stabiliser. The forces exerted by the front wheels upon the stabiliser are equal in magnitude but opposite in direction, so producing a turning moment about the longitudinal axis of the vehicle. This moment is effective in the bearings for the central portion of the stabiliser to tend to set upright the vehicle superstructure, which may be inclined for example due to the cornering.

With known wheel suspension systems having a torsion rod stabiliser, the stabiliser effect is not dependent on the magnitude of the steering lock angle. Tilting movements of the vehicle superstructure about the longitudinal axis will thus be counteracted by the stabiliser with the same restoring moment regardless of whether these movements occur with the vehicle travelling straight ahead or with steering lock applied as the vehicle is negotiating a bend.

By the present invention there is provided a torsion rod stabiliser assembly for a vehicle having a pair of front wheels mounted for steering movement relative to the vehicle superstructure, comprising a generally U-shaped torsion rod stabiliser having a central portion which extends transversely of the vehicle and is rotatably mounted on the vehicle superstructure, and end portions which form lever arms extending generally longitudinally of the vehicle, a pair of steering knuckles which are mounted for pivotal movement about respective steering axes and carry stub axles for the respective front wheels of the vehicle, and a pair of connecting links pivotally connecting the respective lever arms to the corresponding steering knuckles, or to other components which participate in the steering movements, at articulation points which are offset from the respective steering axes at locations such that with the front wheels turned from a straight-ahead position, in addition to the restoring action of the stabiliser due to the differing relative vertical positions of the front wheels during cornering, the lever arm at the inside of the turn is moved downwardly by a force transmitted by way of the respective connecting link, and the lever arm at the outside of the turn is moved upwardly, in the sense of increasing the stabilising action of the stabiliser.

Thereby, the stabiliser effect need not depend simply and solely upon the differing amounts of vertical movement of the front wheels of the vehicle, but may vary in a planned and controlled manner during cornering of the vehicle, such that it becomes possible to utilise the effect of the stabiliser in a differentiated manner depending upon whether the vehicle is travelling straight ahead, or is cornering. With the present assembly, due to diminished stabilising action during straight-ahead travel, not only is there a gain in comfort — because tilting movements of the vehicle superstructure are taken up more gently — but also the stabiliser can be made weaker than usual for attaining the stabilising action during cornering.

Moreover, if desirable for technical reasons affecting road behaviour, the invention makes it possible to produce a de-stabilising effect during cornering by appropriate alteration of the spatial positions of the connecting links.

If the invention is applied to a wheel suspension utilising an upper rectilinear guide member, such as a resilient suspension strut, it is proposed that the stabiliser should be articulated, by way of the connecting links, to a part of the resilient strut which rotates under steering lock.

Due to the fact that, in a torsion rod stabiliser assembly in accordance with the invention, the stabiliser is supported at a component of the wheel suspension participating by an equal amount in the springing movement of the wheel, the further advantage can be achieved that the same stabilising effect can be obtained with a stabiliser which is made weaker and therefore lighter than it would have to be if it were articulated to a component of the wheel suspension system which executes a smaller springing movement than the wheel, or the stub axle, or the housing of a telescopic damper rigidly secured to the stub axle.

The appended claims define the scope of the invention claimed. The invention and how it can be performed are hereinafter particularly described with reference to the accompanying drawing, in which:

Figures 1, 2, 3:
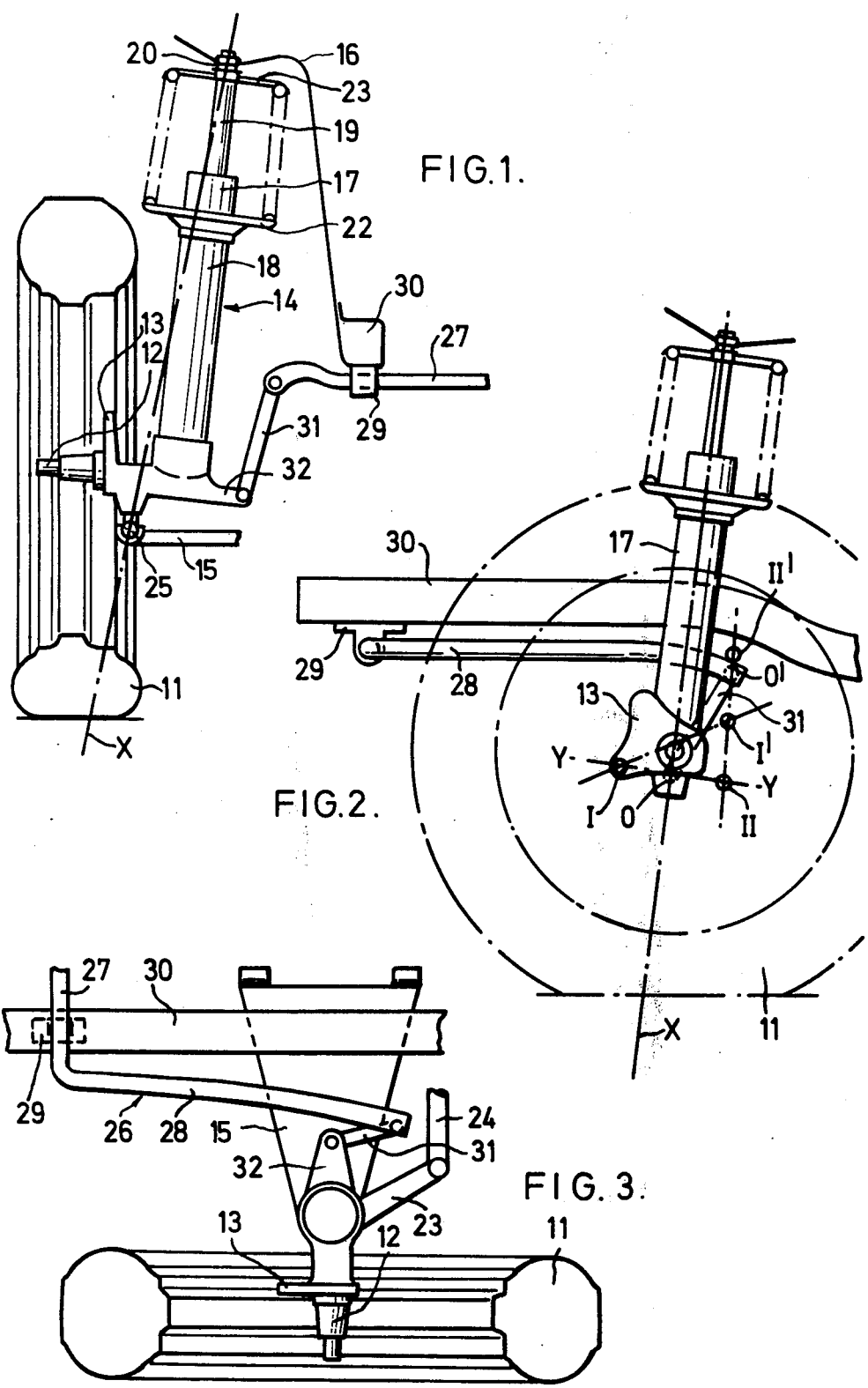
FIG. 1 is a schematic representation of a preferred embodiment of a torsion rod stabiliser assembly in accordance with the present invention, in the context of an independent front suspension utilising a resilient strut and a lower transverse guide arm, the view being in the direction of travel of the vehicle.
FIG. 2 is a fragmentary elevation of the same stabiliser assembly and wheel suspension.
FIG. 3 is a fragmentary plan of the same stabiliser assembly and wheel suspension.

As is best illustrated in FIG. 1 of the drawing, one of a pair of steerable front wheels 11 of a vehicle is mounted on a stub axle 12 carried by a steering knuckle 13. To provide springing for the wheel, the steering knuckle 13 is articulated to a pair of the superstructure 16 of the vehicle by means of a resilient suspension strut 14 and a lower transverse pivotal guide link 15. The resilient suspension strut 14 comprises a telescopic damper 17 having a housing 18 which is fixedly connected to the steering knuckle, and also having a piston rod 19 which is supported on the vehicle superstructure 16 in a resilient and angularly movable manner by means of a bearing 20, with a helical wheel suspension spring 21 arranged concentrically of the damper 17. The lower end of the suspension spring 21 is seated on a spring plate 22 secured to the damper housing 18, and the upper end is seated on a spring plate 23 that is supported on the piston rod 19, through which the wheel forces are transmitted to the vehicle superstructure 16 by way of the bearing 20.

Secured to the steering knuckle 13 there is a track rod 23, to which is articulated a drag link 24 that extends transversely of the vehicle. Steering movement causes the drag link 24 to be displaced approximately in the direction of its axis, with the steering knuckle 13 and wheel 11 pivoting about the steering axis X, which is formed by the connecting line between the upper support point of the resilient strut 14 and a universal joint 25 between the steering knuckle 13 and the transverse pivotal guide link 15.

To limit canting of the vehicle superstructure during cornering, and to limit tilting movements about the longitudinal axis of the vehicle in general, the wheel suspension system incorporates a torsion rod stabiliser 26 which is of U shape and is arranged transversely between the two front wheels 11. The torsion rod stabiliser 26 has a central portion 27 which extends transversely of the vehicle, and end portions 28 which are bent over to form lever arms extending generally longitudinally of the vehicle, these lever arms being articulated to wheel-guiding members for the respective front wheels. The central portion 27 of the stabiliser 26 is rotatably mounted in two bearings 29 on parts of frame side members 30 of the vehicle superstructure 16. The two end portions 28 of the stabiliser are pivotally connected by means of rod-like connecting links 31 to respective inwardly projecting brackets 32 that are rigidly connected to (or formed integrally with) the steering knuckles 13 for the two front wheels 11. For kinematic reasons, the connecting links are pivotally connected both to the end portions 28 and to the brackets 32 by means of universal joints.

From FIG. 2 it will be evident that, as seen in side elevation, the steering axis X extends with a rearward inclination to the vertical in the upward direction, to give positive castor. Accordingly, the plane of pivotal movement of the bracket 32, which is perpendicular to the steering axis, is inclined downwardly of the horizontal in the rearward direction, corresponding to the line Y—Y in FIG. 2.

The position of the bracket 32 when the wheels are set for travelling straight ahead is designated by O, and the corresponding position of the stabiliser end portion is designated by O'. With steering lock applied for a left-hand turn, thus with the left-hand wheel at the inside of the curve, the bracket 32 providing the lower support point for the connecting link 31 is moved forwards into the position designated by I. This movement tends to increase the distance between the bracket 32 and the articulation point of the connecting link 31 to the end portion 28, as compared with the straight-ahead condition, and, due to the positive articulation of the connecting link, the result is that the end portion 28 of the stabiliser 26 is drawn downwards into a position I'.

Conversely, when right-hand steering lock is applied, the articulation points of the connecting link 31 move into the positions II and II'.

The overall result is that when steering lock is applied, the lever arm 28 of the stabiliser 26 for the wheel at the inside of the curve is moved downwards (position I'), and the lever arm for the wheel at the outside of the curve is moved upwards (position II'), whereby there is a greater relative angulation of the lever arms 28 than would be the case without this influencing of the stabilising effect in accordance with the steering lock (say corresponding to an unchanging position of the connecting link 31 in the position O, O' of FIG. 2).

The resulting more intensive torsional twisting of the central portion 27 of the stabiliser 26 increases the stabilising effect. In this way, the righting moment imparted by the stabiliser to the vehicle superstructure during cornering, as a result of the canting of the vehicle superstructure or of the differing relative vertical positions of the front wheels, is supplemented by a further righting moment due solely to the effect of the steering lock necessary for cornering.

It is readily possible to vary the decisive influencing magnitudes, for example the positions of the steering axis X, the pivot radius of the bracket 32, and the oblique disposition of the support member 31 as seen in side elevation in the straight-ahead position, for modification of the characteristic relating the additional relative angulation of the lever arms of the stabiliser to the angle of lock of the steered front wheels.

We claim:

1. A torsion rod stabiliser assembly for a vehicle having a pair of front wheels mounted for steering movement relative to the vehicle superstructure, comprising a generally U-shaped torsion rod stabiliser having a central portion which extends transversely of the vehicle and is rotatably mounted on the vehicle superstructure, and end portions which form lever arms extending generally longitudinally of the vehicle, a pair of steering knuckles which are mounted for pivotal movement about respective steering axes and carry stub axles for the respective front wheels of the vehicle, and a pair of connecting links pivotally connected at the upper ends thereof to the respective lever arms rearwardly of the kingpin axis in the side view and pivotally connected at the lower ends thereof to the corresponding steering knuckles at articulation points which are offset from the respective steering axes at locations such that with the front wheels turned from a straight-ahead position, in addition to the restoring action of the stabiliser due to the differing relative vertical positions of the front wheels during cornering, the lever arm at the inside of the turn is moved downwardly by a force transmitted by way of the respective connecting link, and the lever arm at the outside of the turn is moved upwardly, in the sense of increasing the stabilising action of the stabiliser.

2. A torsion rod stabiliser assembly for a vehicle having a pair of front wheels mounted for steering movement relative to the vehicle superstructure, comprising a generally U-shaped torsion rod stabiliser having a central portion which extends transversely of the vehicle and is rotatably mounted on the vehicle superstructure, and end portions which extend rearwardly from the central portion and form lever arms extending generally longitudinally of the vehicle, a pair of steering knuckles which are mounted for pivotal movement about respective steering axes and carry stub axles for the respective front wheels of the vehicle, and a pair of connecting links extending in a generally forward and downward direction from the free ends of the respective lever arms and each pivotally connected at one end thereof to the lever arms rearwardly of the kingpin axis in the side view and pivotally connected at the other end thereof of the corresponding steering knuckles at articulation points which are offset from the respective steering axes at locations such that with the front wheels turned from a straight-ahead position, in addition to the restoring action of the stabiliser due to the differing relative vertical positions of the front wheels during cornering, the lever arm at the inside of the turn is moved downwardly by a force transmitted by way of the respective connecting link, and the lever arm at the outside of the turn is moved upwardly, in the sense of increasing the stabilising action of the stabiliser.

3. A torsion rod stabiliser assembly for a vehicle having a pair of front wheels mounted for steering movement relative to the vehicle superstructure comprising a generally U-shaped torsion rod stabiliser having a central portion which extends transversely of the vehicle and is rotatably mounted on the vehicle superstructure, and end portions which form lever arms extending generally longitudinally of the vehicle, a pair of steering knuckles which are mounted for pivotal movement about respective steering axes and carry stub axles for the respective front wheels of the vehicle, and a pair of connecting links pivotally connected at the upper ends thereof to the respective lever arms rearwardly of the kingpin axis in the side view and pivotally connected at the lower ends thereof to brackets secured to the respective steering knuckles, at articulation points which are offset from the respective steering axes at locations such that with the front wheels turned from a straight-ahead position, in addition to the restoring action of the stabiliser due to the differing relative vertical positions of the front wheels during cornering, the lever arm at the inside of the turn is moved downwardly by a force transmitted by way of the respective connecting link, and the lever arm at the outside of the turn is moved upwardly, in the sense of increasing the stabilising action of the stabiliser.

4. A torsion rod stabiliser assembly for a vehicle having a pair of front wheels mounted for steering movement relative to the vehicle superstructure, comprising a generally U-shaped torsion rod stabiliser having a central portion which extends transversely of the vehicle and is rotatably mounted on the vehicle superstructure, and end portions which form lever arms extending generally longitudinally of the vehicle, a pair of steering knuckles which are mounted for pivotal movement about respective steering axes and carry stub axles for the respective front wheels of the vehicle, and a pair of connecting links pivotally connected at the upper ends thereof to the respective lever arms rearwardly of the kingpin axis in the side view and pivotally connected at the lower ends thereof to inwardly projecting bracket portions of the respective steering knuckles at articulation points which are offset from the respective steering axes at locations such that with the front wheels turned from a straight-ahead position the lever arm at the inside of the turn is moved downwardly by a steering-related force transmitted by way of the respective connecting link, and correspondingly the lever arm at the outside of the turn is moved upwardly, in the sense of increasing the stabilising action of the stabiliser.

5. A torsion rod stabiliser assembly for a vehicle having a pair of front wheels mounted for steering movement relative to the vehicle superstructure, comprising a generally U-shaped torsion rod stabiliser having a central portion which extends transversely of the vehicle and is rotatably mounted on the vehicle superstructure, and end portions which form lever arms extending generally longitudinally of the vehicle, a pair of steering knuckles which are mounted for pivotal movement about respective steering axes and carry stub axles for the respective front wheels of the vehicle, a pair of resilient suspension struts which have housings thereof fixedly connected to the respective steering knuckles, whereby the suspension struts form rectilinear guide elements for the respective front wheels of the vehicle, and a pair of connecting links extending in a generally forward and downward direction from the distal ends of the respective lever arms and pivotally connected at the upper ends thereof to the respective lever arms rearwardly of the kingpin axis in the side view and pivotally connected at the lower ends thereof to parts of the resilient suspension struts which participate in the steering movements of the front wheels, at articulation points which are offset from the respective steering axes at locations such that with the front wheels turned from a straight-ahead position the lever arm at the inside of the turn is moved downwardly by a steering-related force transmitted by way of the respective connecting link, and correspondingly the lever arm at the outside of the turn is moved upwardly by a steering-related force, thereby producing a stabilising action of the stabiliser additional to that due to the differing relative vertical positions of the front wheels during cornering.

* * * * *